United States Patent [19]

Cerra et al.

[11] 3,995,614
[45] Dec. 7, 1976

[54] SOLAR HEAT COLLECTOR

[75] Inventors: Orlando J. Cerra, New Kensington; Pandit G. Patil, Pittsburgh, both of Pa.

[73] Assignee: PPG Industries, Inc., Pittsburgh, Pa.

[22] Filed: Mar. 19, 1975

[21] Appl. No.: 559,956

[52] U.S. Cl. .................................. 126/271; 52/172
[51] Int. Cl.² .......................................... F24J 3/02
[58] Field of Search ............ 126/270, 271; 52/172; 237/1 A

[56] References Cited
UNITED STATES PATENTS

| | | | |
|---|---|---|---|
| 1,338,644 | 4/1920 | Cartter | 126/271 |
| 2,202,756 | 5/1940 | Cline | 126/271 |
| 2,274,492 | 2/1942 | Modine | 126/271 |
| 3,399,664 | 9/1968 | Suhay | 126/271 |
| 3,453,666 | 7/1969 | Hedges | 126/271 |
| 3,771,276 | 11/1973 | Stewart et al. | 52/172 |

FOREIGN PATENTS OR APPLICATIONS

| | | | |
|---|---|---|---|
| 938,012 | 9/1963 | United Kingdom | 126/271 |

*Primary Examiner*—Kenneth W. Sprague
*Assistant Examiner*—James C. Yeung
*Attorney, Agent, or Firm*—Donald Carl Lepiane

[57] ABSTRACT

A solar heat collector includes a solar energy absorber having a pan-shaped configuration and a cover plate. The sidewalls of the absorber supports the cover plate in spaced relation to the base of the pan-shaped absorber thereby eliminating the need of a spacer frame.

15 Claims, 6 Drawing Figures

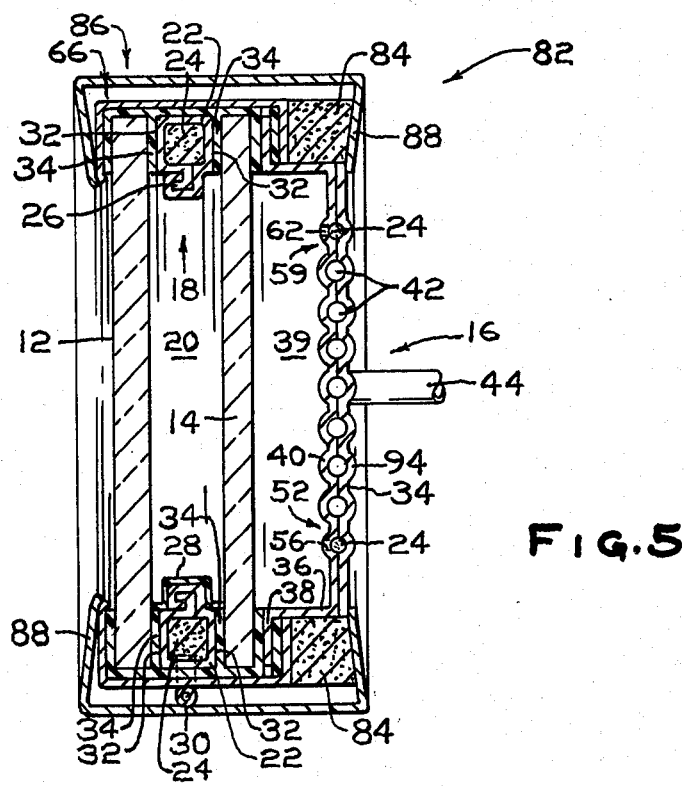
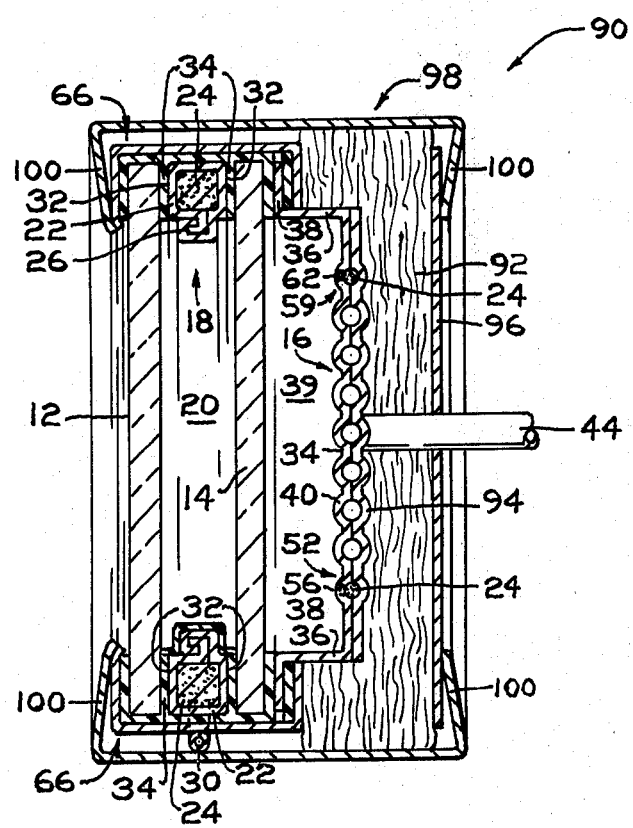

SOLAR HEAT COLLECTOR

RELATED APPLICATIONS

The spacer frame having a breather tube taught in U.S. patent application Ser. No. 550,680, filed on Feb. 18, 1975, in the names of Renato j. Mazzoni and Lester F. Schutrum and entitled "Solar Heat Collector Having A Breather Tube"; the absorber plate taught in U.S. patent application Ser. No. 559,950, filed even date in the names of William R. Bauer and Lester F. Schutrum and entitled "Solar Energy Absorber Plate Having A Breather Tube"; and the method of removing volatiles from moisture-impervious adhesive taught in U.S. patent application Ser. No. 550,679, filed on Feb. 18, 1975, in the names of George H. Bowser, Renato J. Mazzoni and Lester F. Schutrum and entitled "Method Of Fabricating A Solar Heat Collector"; may be used in the practice of the invention. The teachings of the above-identified applications are hereby incorporated by reference.

BACKGROUND OF THE INVENTION

1. Field of the Invention

This invention relates to a solar heat collector having a pan-shaped solar energy absorber.

2. Discussion of the Technical Problems

The advantages of using solar heat collectors to collect solar energy for heating a fluid and/or generating electric power have been recognized in the prior art.

In U.S. patent application Ser. No. 450,703 filed Mar. 13, 1974, in the name of Pandit G. Patil and entitled "Solar Heat Collector Window" there is disclosed a solar heat collector which includes an outer cover plate, an intermediate cover plate, and a solar energy and infrared absorber held in spaced relation by spacer assemblies.

Although the solar heat collectors taught in the above-mentioned application are ideally suitable for collecting and subsequently utilizing solar radiation, it would be advantageous if a solar heat collector was available that is more economical to construct.

BRIEF DESCRIPTION OF THE DRAWING

FIG. 4 is a view taken along lines 4—4 of FIG. 1 and having portions removed for purposes of clarity;

FIG. 5 is a cross-sectional view similar to FIG. 2, of an alternate type of solar heat collector construction incorporating features of the invention; and FIG. 6 is a cross-sectional view similar to FIG. 2, of an alternate type of solar heat collector construction incorporating features of the invention.

SUMMARY OF THE INVENTION

This invention relates to a solar heat collector including a monolithic pan-shaped solar radiation or energy absorber having a base and sidewalls. A cover plate capable of passing solar energy is supported by the sidewalls of the absorber to maintain the cover plate in spaced relationship to the base of the absorber to provide an airspace therebetween. Facilities are provided for maintaining the cover plate on the absorber in spaced relation to the base. The maintaining facilities may be a moisture-impervious seal provided on the absorber and cover plate for preventing moisture from moving into the airspace.

DESCRIPTION OF THE INVENTION

Figure 1:
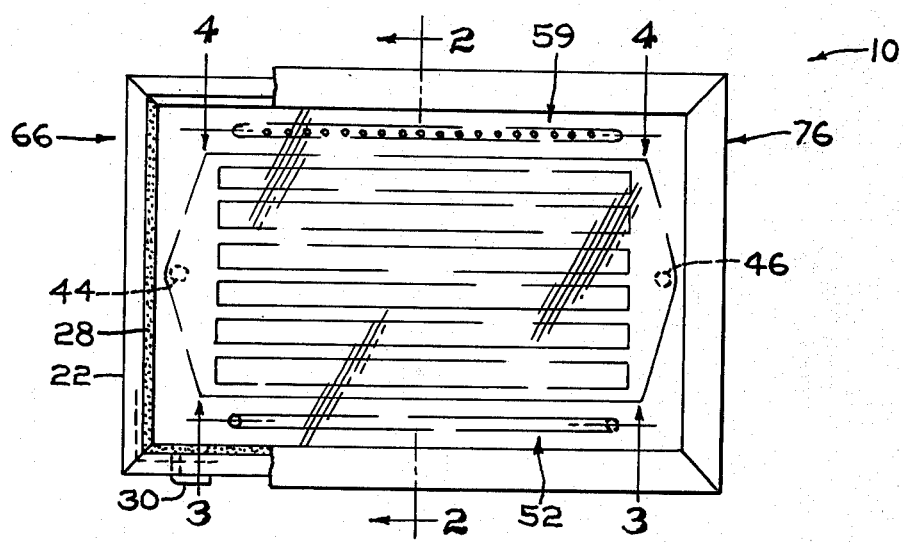
FIG. 1 is a frontal view of a solar heat collector incorporating features of the invention and having portions removed for purposes of clarity.
Figure 2:
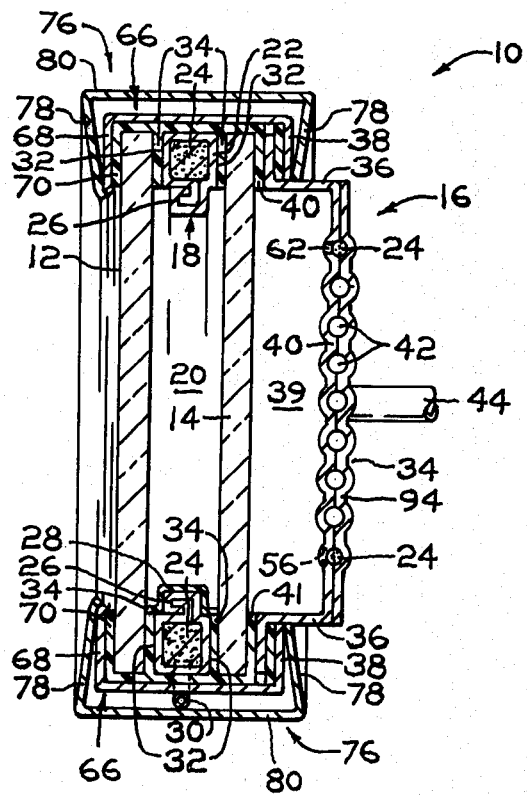
FIG. 2 is a view taken along lines 2—2 of FIG. 1.

Referring to FIGS. 1 and 2, there is shown a solar heat collector 10 having an outer cover plate 12, an intermediate cover plate 14, and a pan-shaped absorber 16 incorporating features of the invention.

The outer and intermediate cover plates 12 and 14, respectively, are selected to pass solar radiation to the absorber 16 while reducing heat loss due to convection and/or conduction. Normally, the cover plates are made of glass which may be thermally or chemically tempered. Further, if desired, one or both of the glass plates may be selectively coated as taught in U.S. patent application Ser. No. 450,702 filed Mar. 13, 1974, in the name of Frank H. Gillery and entitled "Solar Heat Collector". Still further, one, two, three or more cover plates may be used and is not limiting to the invention.

The outer and intermediate cover plates 12 and 14, respectively, are maintained in spaced relation by a spacer assembly 18 to provide an airspace 20 therebetween. The spacer assembly 18, in general, includes a spacer frame 22 preferably of the type disclosed in U.S. patent application Ser. No. 550,680 filed on Feb. 18, 1975 in the names of Renato J. Mazzoni and Lester F. Schutrum and entitled "A Solar Heat Collector Having A Breather Tube". As will be appreciated, the invention is not limited to the type of spacer frame employed and any other type used in the solar heat collector art may be employed.

In general, the spacer frame 22 includes sections of lock seam spacers preferably having dessicant material 24 therein such as silica gel or molecular sieve. Communication is provided between the airspace 20 and the desiccant material 24 by way of passageways 26 provided in a continuous section of the spacer frame to absorb moisture in the airspace 20. The passageways 26 of the remaining section of the spacer frame are sealed in any conventional manner as by a layer of paint 28. A capillary tube 30 is mounted on the outer peripheral surface of the spacer frame spaced from the open passageways 26. In this manner, moisture free air can move into the airspace and out of the airspace to equalize the air pressure in the airspace to the ambient air and regenerate the desiccant material 24 as taught in the above-identified application.

Opposed outer surfaces 32 of the spacer frame 18 are preferably adhered to marginal edge portions of adjacent cover plates by a moisture-impervious adhesive 34 to provide a primary moisture-impervious seal. "Moisture-impervious adhesive" as the term is used is adhesive that prevents moisture from moving into the airspace while adhesively bonding the spacer frame to the cover plates. The moisture-impervious adhesive used may be any of the types known in the solar collector art. For example, the moisture-impervious adhesive taught in U.S. patent application Ser. No. 550,679 filed on Feb. 18, 1976 in the names of George H. Bowser, Renato J. Mazzoni and Lester F. Schutrum and entitled "Method Of Fabricating A Solar Heat Collector" may be used. The teachings of the above-identified application are hereby incorporated by reference.

Referring to FIG. 2, the absorber 16 incorporating features of the invention includes an absorber base 34 for absorbing solar radiation integral with sidewalls 36 (only two shown) and flanges 38 (only two shown) extending therefrom to maintain the absorber base 34 in spaced relationship to the intermediate cover plate 14 to provide an airspace 39 therebetween. The absorber base, sidewalls and flanges are formed from a monolithic piece which is pan-shaped in any conventional manner.

The absorber, in general, is made of a heat conducting material such as aluminum, steel or copper. Surface 40 of the absorber 16 facing the sun is normally treated so as to provide maximum efficiency in absorbing solar energy for heating a heat absorbing medium moved through conduits 42 provided on the absorber base 34. The heat absorbing medium, e.g., water of a mixture of water and ethylene glycol, is moved into inlet pipe 44 through the conduits 42 and out of the conduits by way of outlet pipe 46.

In the prior art, the practice was to provide a spacer frame between the cover plate and absorber. By providing a monolithic pan-shaped absorber, the need for a spacer frame is eliminated. This is because the sidewalls of the absorber maintain the absorber base and cover plate in spaced relation. Eliminating the spacer frame reduces the cost of the solar heat collector because (1) a spacer frame is eliminated and (2) the labor costs for making the spacer frame and assembling it between the absorber and cover plate are eliminated.

A layer of moisture-impervious adhesive 41 is provided between the flanges 38 of the absorber and adjacent marginal edge portions of the intermediate cover plate 14 to prevent moisture from moving into the airspace 39.

As can be appreciated by those skilled in the art, the spacer frame 22, the flanges 38 of the absorber and adjacent cover plates can be sealed using a glass frit and metal solder to form a hermetic glass to metal seal.

Figure 3:
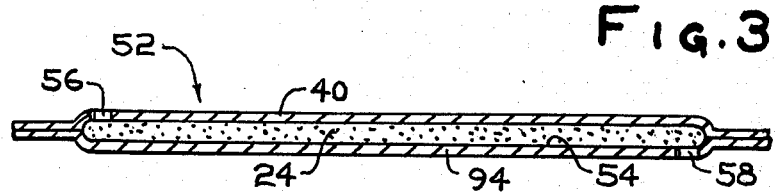
FIG. 3 is a view taken along lines 3—3 of FIG. 1 and having portions removed for purposes of clarity.

A breather tube 52 for equalizing the air pressure in the airspace 39 with ambient air is employed and is provided on the absorber 16. The breather tube may be of the type disclosed in U.S. patent application Ser. No. 559,950 filed even date in the names of William R. Bauer and Lester F. Schutrum and entitled "Solar Energy Absorber Plate Having A Breather Tube". Referring to FIG. 3, the breather tube 52 includes a cavity 54 formed in the absorber base 34 in any conventional manner. The cavity 54 is filled with the desiccant material 24 and has a hole 56 at one end communicating with the airspace 39 and a hole 58 at the other end communicating with the ambient air. In this manner, air moving into the airspace passes through the desiccant material in the cavity 54 to remove any moisture in the air before moving into the airspace 39.

A desiccant tube 59 for removing moisture trapped in the airspace 39 is also provided. Referring to FIG. 4, the desiccant tube 59 includes a cavity 60 preferably formed in the absorber base in any conventional manner filled with the desiccant material 24. Holes 62 provide communication between the desiccant material and the airspace 39 to remove moisture trapped in the airspace during fabrication of the solar collector.

Although not limiting to the invention, but recommended to provide a secondary moisture-impervious seal, there is provided a composite strip 66. The composite strip 66 includes a bendable-formable tape 68, e.g., an aluminum tape having a layer 70 of a moisture-impervious adhesive thereon. The strip 66 is preferably mounted around (1) the peripheral edge portions of the spacer, cover plates, and flanges of the absorber and (2) the marginal edge portions of the outer cover plate and flanges of the absorber.

A channel member 76 of essentially U-shaped, cross-section extends completely around the perimeter of the solar collector to protect the edges of the cover plates and provides structural stability to the collector by urging the cover plates and absorber toward each other about the spacer frame. The channel member 76 is made of metal, e.g., stainless steel and has legs 78 and center portion 80 forming an angle slightly less than 90°. The legs 78 are held apart to permit the insertion of the collector and thereafter the legs are released and spring back to contact the marginal edges of the outer cover plate and the flanges of the absorber. The channel member generally includes several sections of channeling that are joined or abutted together at their ends.

Referring to FIG. 5, there is shown an alternate type of solar heat collector construction incorporating features of the invention. Solar heat colector 82 shown in FIG. 5 is similar to the solar heat collector 10 shown in FIG. 2 with the differences now to be discussed. A layer of thermal-insulating material 84 is adhesively bonded in any conventional manner to the outer sidewalls of the absorber 16. The layer of insulating material reduces convection heat losses from the sidewalls of the absorber.

Types of thermal-insulating materials that may be used but not limited thereto are cork, asbestos, plastic sold under the trademark BAKELITE and synthetic resin polymers sold under the trademark TEFLON.

A U-shaped channel member 86 silimar to the channel member 76 of FIG. 2 is provided around the perimeter of the solar heat collector. Legs 88 of the channel member 86 contact the marginal edge portions of the outer cover plate and the layer of thermal-insulating material.

Referring now to FIG. 6, there is shown still another type of solar heat collector construction incorporating features of the invention. Solar heat collector 90 shown in FIG. 6 is similar to the solar heat collector shown in FIG. 2 with the differences now to be discussed. A layer 92 of thermal-insulating material such as fiber glass or wool is provided agaist the outer absorber surface 94. A protective sheet 96, e.g., plastic, metal, or wood, is mounted against the thermal-insulating material with the inlet pipe 44 extending beyond the protective sheet. A U-shaped channel member 98 similar to the channel member 76 of FIG. 2 is provided around the perimeter of the solar heat collector. Legs 100 of the channel member 98 contact marginal edge portions of the outer cover plate and protective sheet.

The use of insulation against the outer surface of an absorber is taught in U.S. patent application Ser. No. 550,507 filed on Feb. 18, 1975 in the name of Pandit G. Patil and entitled "Solar Heat Collector Unit". The teachings of the above-identified application are hereby incorporated by reference.

DETAILED DESCRIPTION OF THE INVENTION

The invention will be described to construct a solar heat collector in accordance to the teachings of the invention.

A two ply sheet of aluminum approximately 77 inches (2 meters) × 35 inches (0.9 meter) is shaped in any conventional manner to provide a pan-shaped absorber 16 having a base 34, sidewalls 36 and flanges 38 as shown in FIG. 2. The base has dimensions of about 75 inches (1.9 meters) × 33 inches (0.8 meter), the sidewalls have a height of about ⅜ inch (0.95 centimeter) and the flanges have a width of about ⅝ inch (1.6 centimeters).

A conduit 42 capable of passing water at a flow rate of about 0.3 gallons per minute (0.02 liters per second) at atmospheric pressure is provided in the absorber base 34. A pair of cavities 54 and 60 as shown in FIGS. 2 and 3, respectively, are provided about the conduit 42 to provide a breather tube 52 and desiccant tube 59, respectively. The breather tube 52 is of the type taught in the above-mentioned U.S. Patent Application filed in the names of William R. Bauer and Lester F. Schutrum.

Each of the cavities 54 and 60 has a volume of about 10 cubic inches (163 milliliters) and a length of about 68 inches (1.7 meters). With reference to FIG. 3, a hole 56 having a diameter of ¼ inch (0.64 centimeter) provides communication through surface 40 of the absorber base 34 and the cavity 54. A hole 58 spaced about 65 inches (1.7 meters) from the hole 56 and having a diameter of about 0.020 inch (0.05 centimeter) provides communication through surface 94 of the absorber base 34 and the cavity 54. Desiccant material 24, e.g., silica gel, is moved into the cavity by way of the hole 56. Thereafter the hole 56 is plugged with a porous material, e.g., steel wool or a felt pad, to prevent the silica gel from falling out of the cavity while providing communication between the desiccant material and airspace.

With reference to FIG. 4, a plurality of holes 62 provide communication through the surface 40 of the absorber base 34 and the cavity 60. The holes 62 are on a center-to-center spacing of about 1 inch (2.54 centimeters). One of the holes has a diameter of ¼ inch (0.64 centimeter) to move desiccant material, e.g., silica gel, into the cavity 60 and is thereafter plugged with a porous material as was hole 56 of the breather tube 52. The remaining holes 62 have a diameter of about 0.070 inch (0.18 centimeter) to provide communication between the desiccant material and the airspace 39.

An inlet pipe and outlet pipe 44 and 46, respectively, are connected to the conduits as shown in FIGS. 1 and 2 for moving a heat absorbing medium, e.g., water or a mixture of water and ethylene glycol therethrough.

The interior surfaces 40 of the absorber pan are provided with a layer of black paint such as the type sold by PPG Industries, Inc., under the trademark DURACRON super 600L/G and fired at a temperature of 350° F. for 15 to 20 minutes to provide the surface 40 of the absorber with non-selective surface having an absorptivity coefficient for solar radiation and a wavelength of 0.3 to 2.1 microns and an emissivity coefficient for infrared radiation in a wavelength of 2 to 20 microns of about 0.95.

A pair of commercial soda-lime-glass sheets having dimensions of 7 feet (2.1 meters) × 3 feet (0.9 meter) × ⅛ inch (0.32 centimeter) thick are provided. The glass sheets are preferably tempered so as to reduce the probability of breakage during use, for example, from stones or hail. The glass sheets are cleaned in any conventional manner to remove any foreign particles that may inhibit the passage of the solar radiation through the glass sheet toward the absorber base.

With reference to FIG. 2, a spacer frame 22 is constructed in accordance to the teachings of the above-identified U.S. patent application filed in the names of Renato J. Mazzoni and Lester F. Schutrum. In general, the spacer frame is constructed by mitering the ends of four (4) sections of a lock seam spacer of the type disclosed in U.S. Pat. No. 2,684,266. A desiccant material 24, e.g., silica gel or molecular sieve is provided in the sections and the sections joined together as by welding to provide a spacer frame having dimensions of 7 feet (2.1 meters) × 3 feet (0.9 meter) × ⅛ inch (1.25 centimeters).

Two adjacent sections have their passageways 26 coated with a paint 28 such as the type sold by PPG Industries, Inc., under the trademark DURACRON super 600L/G.

A capillary tube 30 having an outside diameter of 0.070 inch (0.18 centimeter) and an inside diameter of 0.020 inch (0.05 centimeter) is provided adjacent joined ends of the spacer section having their passageway sealed.

A layer of moisture-impervious adhesive of the type used in the art having a thickness of about 15 to 20 mils (0.03 to 0.05 centimeter) and a width of less than 5/16 inch (0.8 centimeter) is extruded onto opposed outer surfaces 32 of the spacer frame in any conventional manner.

In accordance to the teachings of the above-identified U.S. Patent Application filed in the names of George H. Bowser, Renato J. Mazzoni and Lester F. Schutrum, the spacer frame having the adhesive is heated in any conventional manner, to drive off volatiles that are in the moisture-resistant adhesive and to drive off any moisture in the desiccant material 24.

The absorber 16 is positioned on a rigid surface with the surface 40 facing upward. A layer of volatile free, moisture-resistant adhesive having a thickness of about 0.015 to 0.020 inch (0.13 to 0.05 centimeter) and a width of less than about 5/16 inch (0.8 centimeter) is provided on the upper surface of the flange of the absorber. The intermediate glass sheet 14 is positioned on top of the absorber with the marginal edges aligned. Thereafter, in a like manner, the spacer frame is positioned on the intermediate glass sheet followed by the outer glass sheet.

The adhesive between the spacer frame, glass sheets and flanges of the absorber is flowed under a pressure of between about 2 to 10 pounds per square inch (0.14 − 0.7 kilograms per square centimeter) in any conventional manner to form a primary moisture-resistant seal.

Thereafter a composite strip 66 is provided. The strip includes a 1½ inch (3.8 centimeters) wide aluminum tape 68 having a thickness of 0.010 inch (0.03 centimeter) and a layer of moisture-resistant adhesive 70 provided on a surface in any conventional manner. The adhesive 70 is similar to the adhesive 34. The strip is applied in any conventional manner to (1) the peripheral edges of the absorber flanges, spacer frame, and glass sheets and (2) bent over the marginal edge portions of the outer glass sheet and the flange of the absorber to provide a secondary moisture-resistant seal with the tube 30 extending beyond the tape 66.

Preferably the strip extends completely around the perimeter of the collector with the ends overlapping. To insure a good secondary moisture-impervious seal, moisture-impervious adhesive is provided around the tube 30 where it extends through the tape 52 of the composite strip. Thereafter the tube is bent toward the tape 52 of the composite strip 50 and a covering is preferably provided over the tube 60 to prevent extremely large particles of dust from moving into the tube which could clog the tube. The covering may be a piece of aluminum or a felt pad inserted into the end of the tube.

A channel member 70 of essentially U-shaped cross-section is provided completely around the perimeter of the collector to protect the edges of the glass sheets and to provide structural stability to the collector by urging the glass sheets and absorber toward each other.

As can now be appreciated by those skilled in the art, the solar collector described in merely one type that may be constructed in accordance to the teachings of the invention. Other types may be constructed within the scope of the invention.

What is claimed is:

1. A solar heat collector comprising:
    a monolithic pan-shaped solar energy absorber having a base and sidewalls;
    a cover plate capable of passing solar energy supported by said sidewalls of said absorber in spaced relation to said base of said absorber to provide an airspace therebetween;
    a moisture-impervious adhesive mounting said cover plate and said absorber to prevent moisture from moving into the air space; and
    moisture-absorbing means mounted in said absorber and communicating with the air space to absorb moisture in the air space.

2. The solar heat collector as set forth in claim 1, wherein said absorber has a breather tube for equalizing air pressure in the air space with the ambient air while preventing moisture from moving into the air space.

3. The solar heat collector as set forth in claim 1, wherein said absorber has conduit means for moving a heat absorbing medium therethrough wherein the heat absorbing medium is heated by solar radiation as it moves through said conduit means.

4. The solar heat collector as set forth in claim 1, wherein said absorber further includes:
    flanges integral with the sidewalls for supporting the cover plate in spaced relation with said base of said absorber.

5. The solar heat collector as set forth in claim 4, further including:
    a U-shaped channel member mounting the perimeter of said plate and said flanges of the absorber and having opposed legs engage said plate and said flanges to urge said plate and said flanges toward each other.

6. The solar heat collector as set forth in claim 1, further including:
    a second cover plate capable of passing solar energy; and
    spacer assembly means for (1) maintaining said first cover plate in spaced relation to said second cover plate to provide an airspace therebetween; (2) preventing moisture from moving into the airspace between said cover plates and (3) absorbing moisture in the airspace between said cover plates.

7. The solar heat collector as set forth in claim 6, further including:
    said spacer assembly means further including a breather tube for equalizing the air pressure in the airspace between the cover plates with the ambient air pressure while preventing moisture from moving into the airspace; and
    a breather tube provided on said absorber for equalizing the air pressure in the airspace between the first cover plate and said absorber while preventing moisture from moving therein.

8. The solar heat collector as set forth in claim 7 wherein said absorber further includes:
    flanges integral with the sidewalls for supporting said first cover plate in spaced relation to said base of said absorber; and further including
    a bendable-formable tape having a layer of moisture-impervious adhesive thereon, said adhesive mounted (1) on the peripheral edge portions of said cover plates and (2) on the marginal edge portions of said second cover plate and said flanges of said absorber.

9. The solar heat collector as set forth in claim 8, further including:
    a U-shaped channel member mounted about the perimeter of the cover plates and said flanges of said absorber and having opposed legs engaging said second cover plate and said flanges to urge the cover plates and said absorber toward each other.

10. The solar heat collector as set forth in claim 8, further including:
    a thermal-insulating material positioned against outer surface of said absorber sidewalls; and
    a U-shaped channel member mounted about the perimeter of the cover plates, said flanges of said absorber and said thermal-insulating material and having opposed legs engaging said second cover plate and thermal insulating material to urge said cover plates, absorber and thermal-insulating material toward each other.

11. The solar heat collector as set forth in claim 8, further including:
    a thermal-insulating material mounted against the outer absorber surface;
    a protective sheet mounted against said thermal-insulating material; and
    a U-shaped channel member mounted about the perimeter of the cover plates, said flanges of said absorber, said thermal-insulating material and said protective sheet and having opposed legs engaging said second cover plate and said protective sheet to urge said protective sheet toward the outer absorber surface against said thermal-insulating material.

12. The solar heat collector as set forth in claim 1, wherein said absorber is made of metal.

13. The solar heat collector as set forth in claim 1, wherein said moisture-absorbing means includes a cavity formed in the base of said absorber and desiccant material mounted in said cavity.

14. In a solar heat collector of the type having a cover plate capable of passing solar energy mounted in spaced relation to a solar energy absorber to provide an air space therebetween and a moisture-impervious seal to prevent moisture from moving into the air space between the absorber and cover plate, the improvement comprising:
    moisture-absorbing means mounted in the absorber and communicating with the air space to absorb moisture in the air space.

15. The improved solar heat collector as set forth in claim 14 wherein said moisture-absorbing means includes a cavity formed in the absorber and desiccant material mounted in said cavity.

* * * * *